United States Patent
Suzuki

[19]

[11] Patent Number: 6,114,787
[45] Date of Patent: Sep. 5, 2000

[54] METHOD OF DIGITALLY CONTROLLING MAGNETIC BEARING SPINDLE

[75] Inventor: Nobuyuki Suzuki, Shizuoka, Japan

[73] Assignee: NTN Corporation, Osaka, Japan

[21] Appl. No.: 08/925,141

[22] Filed: Sep. 8, 1997

[30] Foreign Application Priority Data

Sep. 9, 1996 [JP] Japan .................................. 8-237944

[51] Int. Cl.[7] .............................. H02K 7/09; F16C 32/04
[52] U.S. Cl. ............................................................ 310/90.5
[58] Field of Search ....................... 310/90.5; 324/207.23

[56] References Cited

FOREIGN PATENT DOCUMENTS

| 0185765 | 7/1986 | European Pat. Off. . |
|---|---|---|
| 0193609 | 9/1986 | European Pat. Off. . |
| 0698745 | 2/1996 | European Pat. Off. . |
| 195 39 976 | 5/1996 | Germany . |
| 2176317 | 12/1986 | United Kingdom . |
| WO94/20767 | 9/1994 | WIPO . |

*Primary Examiner*—Nestor Ramirez
*Assistant Examiner*—K. Imayoshi Tamai
*Attorney, Agent, or Firm*—McDermott, Will & Emery

[57] ABSTRACT

A sensor output for each axis of a five-axis control type magnetic bearing spindle is input to a multiplexer, time divisionally selected, converted to a digital signal by an A/D converter, and then applied to an MPU for control operation. Subsequently, a control signal is converted to an analog signal by a D/A converter for every axis, and A/D conversion, control operation and D/A conversion are sequentially processed.

1 Claim, 4 Drawing Sheets

METHOD OF DIGITALLY CONTROLLING MAGNETIC BEARING SPINDLE

BACKGROUND OF THE INVENTION

1. Field of the Invention

The present invention relates to a method of digitally controlling a magnetic bearing spindle and a control apparatus therefor. The invention relates more specifically to a method of digitally controlling each bearing of a multiaxis control type magnetic bearing spindle and a control apparatus therefor.

2. Description of the Related Art

FIG. 5 is a perspective view showing the appearance of a conventional five-axis control type magnetic bearing spindle and a schematic block diagram of a control system.

The five-axis magnetic bearing spindle will now be described as an example of a multiaxis type magnetic bearing spindle with reference to FIG. 5. One end of a spindle 2 is radially supported by a radial magnetic bearing 10 having electromagnets for X and Y axes 11X and 11Y as well as electromagnets for X and Y axes 12X and 12Y, which are mutually arranged at right angles on an XY plane perpendicular to the axis of spindle 2. Similarly, the other end of spindle 2 is radially supported by a radial magnetic bearing 20 having electromagnets for X and Y axes 21X and 21Y as well as electromagnets for X and Y axes 22X and 22Y. Spindle 2 is driven by a motor 9 to rotate in a direction indicated by an arrow B. Further, spindle 2 is axially supported by a thrust magnetic bearing 8 to avoid axial (in the Z direction) displacement.

On the X and Y axes on the plane where the above mentioned radial magnetic bearing 10 is arranged, positioned are position sensor coils for X and Y axes 14X and 14Y, which detect displacement in the directions of X and Y axes with respect to the reference position in spindle 2, and generate outputs in accordance with the amount of displacement. Similarly, position sensor coils for X and Y axes 24X and 24Y are positioned in X and Y axes on the plane where radial magnetic bearing 20 is arranged.

Further, provided on the end surface at one end of spindle 2 is a sensor 7 for detecting axial displacement, which is connected to a control circuit 30 along with position sensor coils for X and Y axes 14X and 14Y as well as position sensor coils for X and Y axes 24X and 24Y.

Electromagnets for X and Y axes 11X and 11Y respectively include control windings 13X and 13Y for adjusting electromagnetic force, which are controlled by control circuit 30. Similarly, electromagnets for X and Y axes 21X and 21Y respectively include control windings 23X and 23Y for adjusting electromagnetic force, whose exciting current is controlled by control circuit 30. Thrust magnetic bearing 8 is also controlled by control circuit 30.

FIG. 6 is a block diagram of the control circuit shown in FIG. 5. In FIG. 6, outputs from the sensors in the axes shown in FIG. 5 are respectively applied to A/D converters 31 to 35 as input signals for first to fifth channels to be sampled, converted to digital signals and applied to an MPU 36. MPU 36 performs control operation for five axes and applies the results to D/A converters 37 to 41. D/A converters 37 to 41 convert control signals to analog signals to output analog signals for every axis. Each analog control signal is amplified by an amplifier, not shown, and applied to the electromagnet for the corresponding bearing.

FIG. 7 shows a process flow of MPU 36 during one sampling period. In MPU 36 shown in FIG. 6, control operations for the A/D converted digital signals from 1 to 5 channels are sequentially performed, and the operation results are then converted to analog signals by D/A converters 37 to 41 at the same time. Here, the control operation includes, for example, proportional operation, integral operation, phase compensation operation, gyro compensation operation or the like.

In the conventional example shown in FIG. 6, each axis requires one of A/D converters 31 to 35, which are relatively expensive electronic parts, increasing cost for the apparatus as a whole. In addition, every factor of control operation, such as proportional, integral, phase compensation and gyro compensation operations, is performed in the same sampling period. The sampling frequency is therefore determined such that phase compensation operation for high frequency component is not affected by phase lag due to dead time. Commonly, sampling frequency is set on the side of at least one decade higher frequency in control frequency band, or it is determined from the time required for control operation, often governing control band. It is therefore of great importance how to reduce operation time to achieve higher controllability.

However, high-speed sampling is not necessarily required for every control operation and operations such as proportional, integral and gyro compensation operations are directed for a relatively low frequency component, so that even the slowest sampling frequency is sufficient.

SUMMARY OF THE INVENTION

It is therefore an object of the present invention to provide a method of digitally controlling a magnetic bearing spindle and a control apparatus therefor which can decrease the number of A/D converters to reduce cost, reduce the conversion rate required for an A/D converter and increase sampling frequency to achieve enhanced controllability.

Briefly stated, in a method of digitally controlling each axis of a multiaxis control type magnetic bearing spindle by an output from a sensor provided corresponding to the axis, control operations are separated into the operation for high frequency component and that for low frequency component, providing mutually different sampling frequencies.

Therefore, according to the present invention, sampling frequency for high frequency phase compensation control operation can be increased, thereby enhancing controllability.

In a more preferred embodiment, an output from a sensor for each axis is time divisionally selected for sampling, control operation is performed in accordance with the sampled sensor output, and sampling time is defined only as the sum of the time required for control operation for every axis. Thus, in the more preferred embodiment of the present invention, the number of A/D converters can be decreased to reduce cost. In addition, conversion rate required for the A/D converter can be reduced to increase sampling frequency and controllability.

In another aspect of the present invention, a control apparatus for digitally controlling each axis of a multiaxis control type magnetic bearing spindle by an output from a sensor provided corresponding to the axis is provided, in which a sensor output for each axis is time divisionally selected and output by a selection circuit, the selected sensor output is sampled by a sampling circuit, control operation is performed by an operation circuit based on the sampled sensor output, a digital signal undergone the control operation is converted to an analog signal by a D/A converter, and a corresponding electromagnet is controlled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
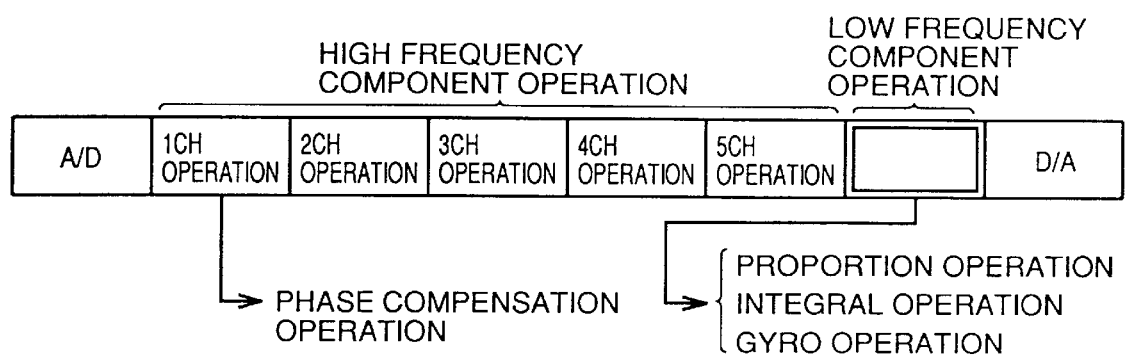
FIG. 1 is a diagram showing a process flow during one sampling period in accordance with an embodiment of the present invention.
Figure 6:
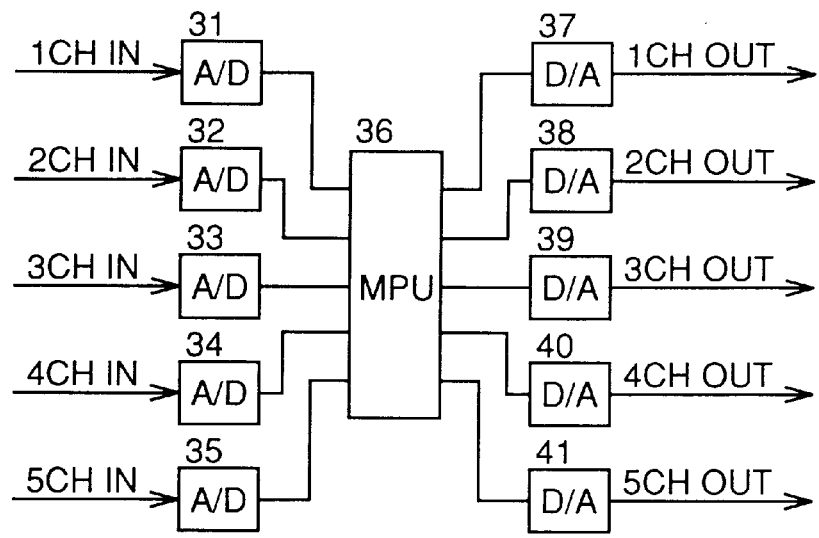
FIG. 6 is a block diagram showing a control circuit for digitally controlling each bearing by an output from a sensor.
Figure 7:
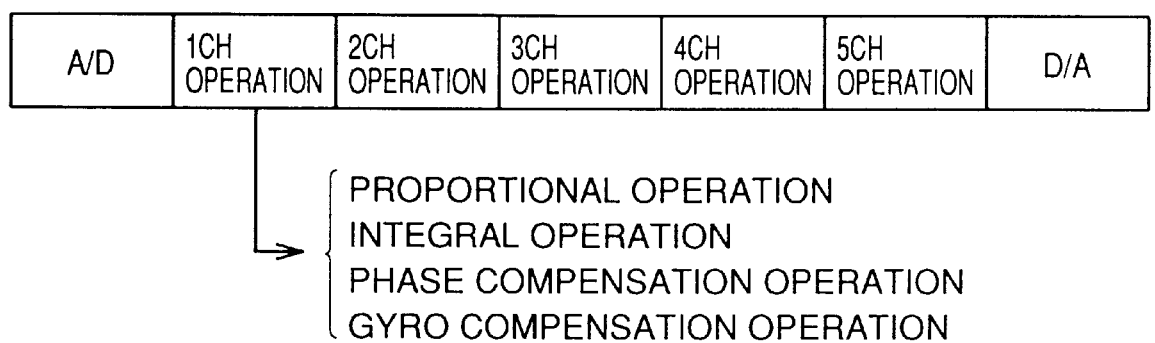
FIG. 7 is a diagram showing a process flow of an MPU during one sampling period.

FIG. 1 is a diagram showing each process flow during one sampling period in an embodiment of the present invention. In the present embodiment, the structure hereinbefore shown in FIG. 6 is used, and phase compensation operation, which is high frequency component operation, is performed for every channel, whereas proportional, integral and gyro compensation operations, which are low frequency component operations, are performed only for one of five channels. Accordingly, the sampling frequency for these control operations is one fifth the actual sampling frequency, and during five sampling periods a constant value is added to the result obtained from high frequency component operation, which differs from each sampling portion, for output. In one embodiment of the present invention, the sampling frequency for high frequency phase compensation control operation can therefore be increased, thereby enhancing controllability.

Figure 2:
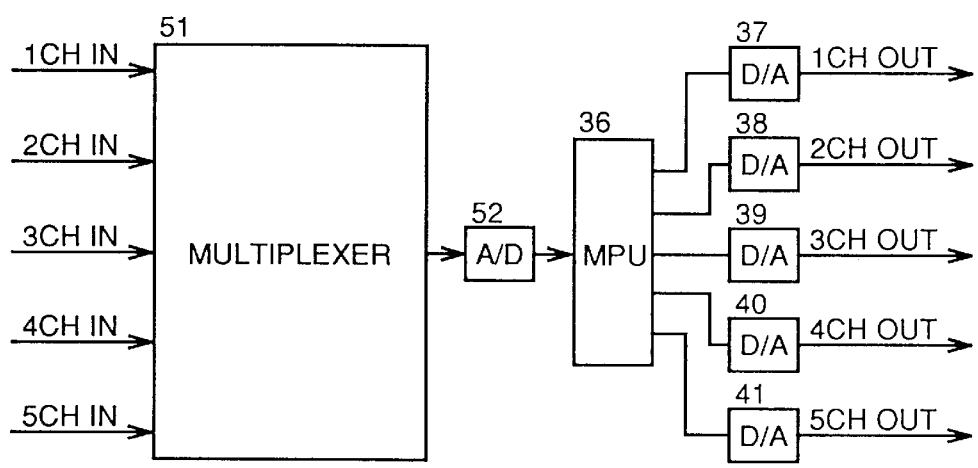
FIG. 2 is a block diagram showing the embodiment of the present invention.

FIG. 2 is a block diagram showing another embodiment of the present invention. In FIG. 2, a multiplexer 51 and only one A/D converter 52 are provided rather than five A/D converters 31 to 35 shown in FIG. 6. Sensor signals for the first to the fifth channels are sequentially selected by multiplexer 51 to be applied to A/D converter 52. A/D converter 52 converts the sequentially selected sensor signals to digital signals. It is noted that D/A converters 37 to 41 are provided corresponding to each axis as in FIG. 6. This is because an analog output signal for each axis must be held during one sampling time.

Figure 3:
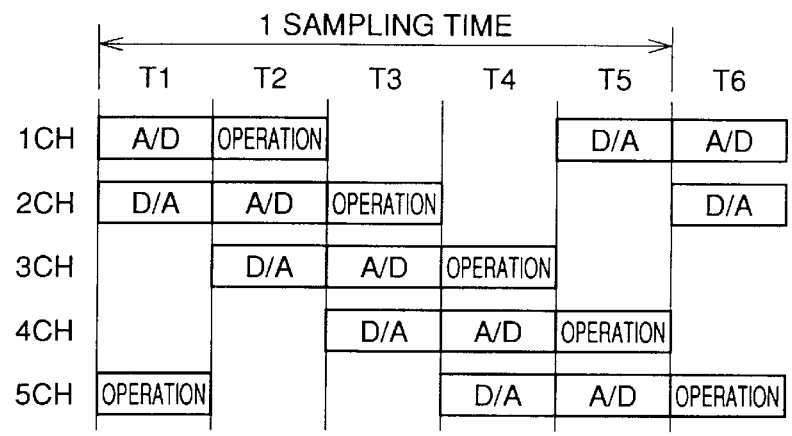
FIG. 3 is a diagram showing a process flow of signal in accordance with another embodiment.

FIG. 3 is a diagram showing a process flow for a signal in accordance with another embodiment of the present invention. In FIG. 3, A/D conversion at the first channel, D/A conversion at the second channel and control operation at the fifth channel are performed at the same time in a frame T1. Similarly, control operation at the first channel, A/D conversion at the second channel and D/A conversion at the third channel are performed at the same time in a frame T2. Similar processes are repeated for a frame T3 and after.

The time for one frame is determined either by A/D conversion time or control operation time, whichever is longer. However, it is commonly determined by control operation time. It is noted that D/A converters 37 to 41 are independent of each axis, so that the conversion time including three frames at most is allowable. In the case of the first channel, for example, D/A conversion may require frames from T3 to T5.

The above mentioned control provides a sampling time of five frames for each axis. This equals to a total of control operation time for each axis. On the other hand, in a conventional method, a sampling time is a total of A/D conversion and D/A conversion time in addition to control operation time. Consequently, the use of the present invention ensures that a sampling period is enhanced, and eliminates the need for expensive high-speed A/D and D/A converters.

Figure 4:
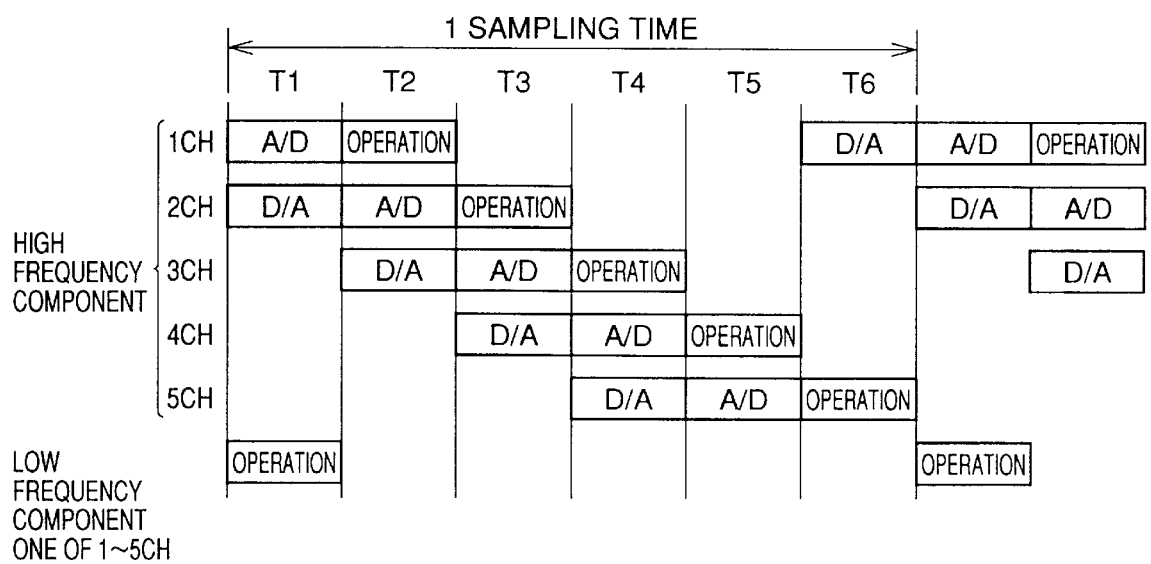
FIG. 4 is a diagram showing a process flow in accordance with still another embodiment of the present invention.
Figure 5:
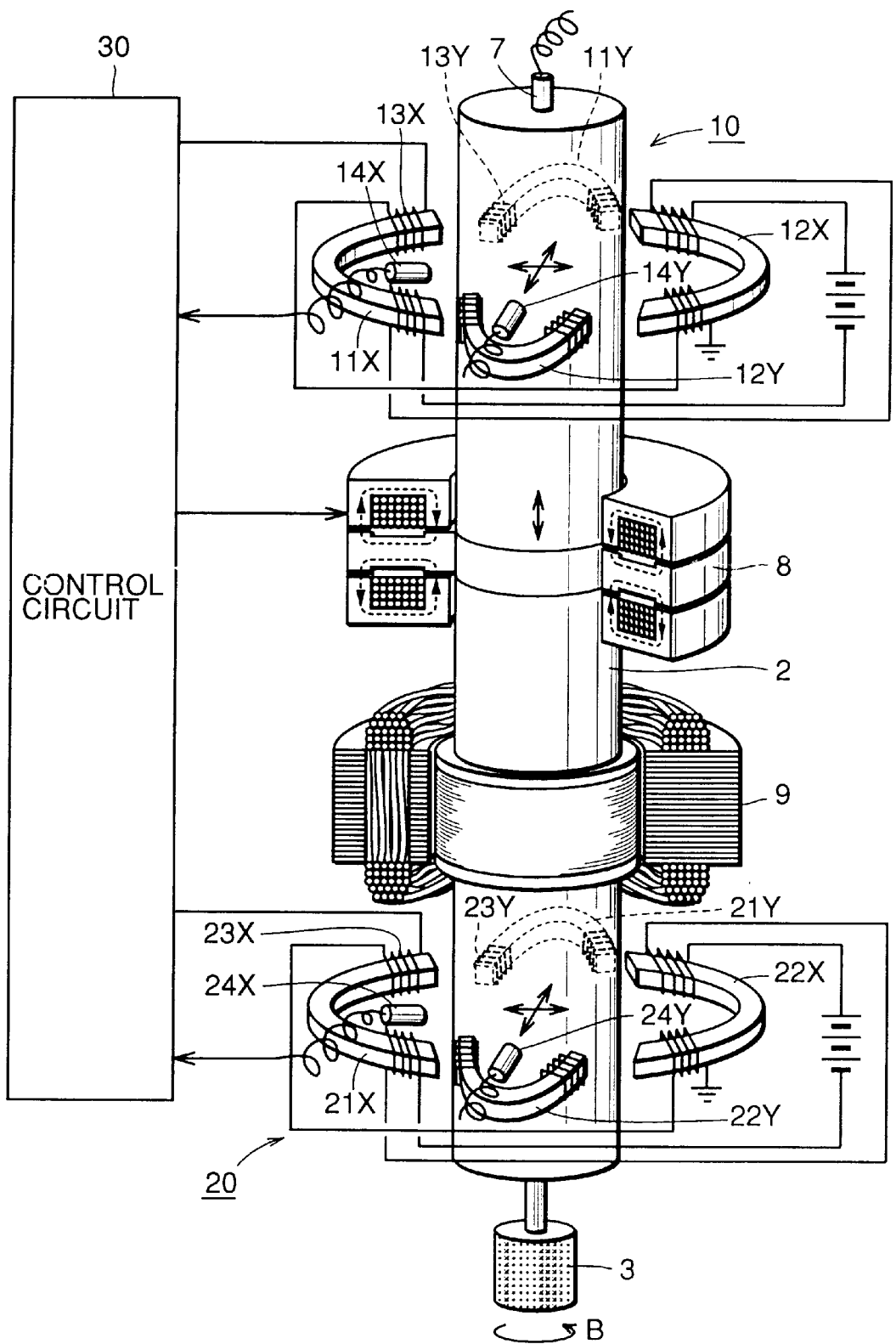
FIG. 5 is a perspective view showing the appearance of a conventional five-axis control type magnetic bearing spindle with a block diagram.

FIG. 4 is a diagram showing a process flow in accordance with still another embodiment of the present invention. The present embodiment has a structure shown in FIG. 2, in which operation for a low frequency component is performed every six frames. Thus, as in the above mentioned embodiment, low frequency component operation or each channel can be performed once in five sampling times.

Assume that the time required for A/D conversion, D/A conversion, high frequency component operation and low frequency component operation are all 5 $\mu$sec. Then, if one sampling time is compared, the second and third embodiments only requires 40 and 30 $\mu$sec, respectively, whereas the conventional example requires as much as 60 $\mu$sec.

As mentioned in the foregoing, according to the embodiments of the present invention, control operations are separated into the operation for high frequency component and that for low frequency component so as to provide sampling frequencies different from each other for the both, and therefore the sampling frequency for high frequency phase compensation control operation can be increased and controllability is enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of digitally controlling each axis of a multiaxis control type magnetic bearing spindle by an output from a sensor provided corresponding to said each axis, wherein control operations for said each axis are separated into a high frequency component operation and a low frequency component operation to provide mutually different sampling frequencies, and said low frequency component operation is performed once for every n sampling periods where n is the number of axes.

* * * * *